(12) United States Patent
Nishimura

(10) Patent No.: US 11,140,679 B2
(45) Date of Patent: Oct. 5, 2021

(54) PACKET PROCESSING APPARATUS AND PACKET PROCESSING METHOD

(71) Applicant: FUJITSU LIMITED, Kawasaki (JP)

(72) Inventor: Kazuto Nishimura, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 16/357,888

(22) Filed: Mar. 19, 2019

(65) Prior Publication Data

US 2019/0215832 A1     Jul. 11, 2019

Related U.S. Application Data

(63) Continuation of application No. PCT/JP2018/000174, filed on Jan. 9, 2018.

(30) Foreign Application Priority Data

Jan. 30, 2017    (JP) .............................. JP2017-014299

(51) Int. Cl.
*H04W 72/04*      (2009.01)
*H04W 28/02*      (2009.01)
*H04L 12/44*       (2006.01)
*H04W 28/10*      (2009.01)
*H04W 84/04*      (2009.01)

(52) U.S. Cl.
CPC ......... *H04W 72/0446* (2013.01); *H04L 12/44* (2013.01); *H04W 28/0278* (2013.01); *H04W 28/10* (2013.01); *H04W 84/042* (2013.01)

(58) Field of Classification Search
CPC ............. H04W 72/0446; H04W 28/10; H04W 28/0278; H04W 84/042; H04W 88/085
See application file for complete search history.

(56) References Cited

U.S. PATENT DOCUMENTS 5,742,606 A     4/1998    Iliadis et al.
6,005,868 A    12/1999    Atsuo
(Continued)

FOREIGN PATENT DOCUMENTS

JP      09-504672       5/1997
JP      10-107803       4/1998
(Continued)

OTHER PUBLICATIONS

International Search Report, mailed in connection with PCT/JP2018/000174 and dated Mar. 27, 2018 (8 pages).
(Continued)

*Primary Examiner* — Peter P Chau
(74) *Attorney, Agent, or Firm* — Fujitsu Patent Center

(57) ABSTRACT

A packet processing apparatus includes a plurality of queues that store received packets according to types of the received packets; and a processor coupled to the plurality of queues and configured to: collect information on packet quantity of received packets in each time slot, identify a periodicity pattern of the received packets based on the packet quantity of the received packets in each time slot, based on the identified periodicity pattern of the received packets, identify a time slot section where received packets of a predetermined type are to be outputted preferentially, and control opening and closing of each of the plurality of queues in the identified time slot section.

10 Claims, 17 Drawing Sheets

(56) References Cited

U.S. PATENT DOCUMENTS

| | | | |
|---|---|---|---|
| 2002/0122424 A1 | 9/2002 | Kawarai et al. | |
| 2003/0202525 A1 | 10/2003 | Teruhiko | |
| 2015/0365337 A1* | 12/2015 | Pannell | H04J 3/0697 |
| | | | 370/503 |
| 2015/0365338 A1* | 12/2015 | Pannell | H04L 47/56 |
| | | | 370/412 |
| 2019/0166061 A1* | 5/2019 | Farkas | H04L 47/627 |

FOREIGN PATENT DOCUMENTS

| | | |
|---|---|---|
| JP | 2002-261826 | 9/2002 |
| JP | 2003-318964 | 11/2003 |
| JP | 2015-530766 | 10/2015 |
| JP | 2016-116026 | 6/2016 |
| WO | 2014/050125 | 4/2014 |
| WO | 2016/132402 | 8/2016 |

OTHER PUBLICATIONS

Written Opinion of the International Searching Authority mailed in connection with PCT/JP2018/000174 and dated Mar. 27, 2018, with partial English translation (6 pages).
JPOA —Office Action of Japanese Patent Application No. 2017-014299 dated Aug. 4, 2020 with Machine Translation Remaining references cited in the JPOA were previously submitted in the IDS filed on Mar. 19, 2019.

* cited by examiner

FIG. 4

| TS NUMBER (26A) | FIRST GATE (26B) | SECOND GATE (26C) | RETENTION PERIOD (26D) |
|---|---|---|---|
| 1 | O | C | 10 μs |
| 2 | O | C | 20 μs |
| 3 | O | C | 10 μs |
| 4 | O | O | 5 μs |
| 5 | O | O | 5 μs |
| 6 | O | O | 15 μs |
| ⋮ | ⋮ | ⋮ | ⋮ |
| N | O | O | 15 μs |

FIG. 7

| TS NUMBER | FIRST GATE | SECOND GATE | RETENTION PERIOD |
|---|---|---|---|
| 1 | O | O | 70us |
| 2 | O | O | 70us |
| 3 | O | O→C | 70us |
| 4 | O | O→C | 70us |
| 5 | O | O→C | 70us |
| 6 | O | O→C | 70us |
| 7 | O | O→C | 70us |
| 8 | O | O | 70us |
| ⋮ | | | |
| 13 | O | O | 70us |
| 14 | O | O | 90us |

ONE PERIOD = 1 ms = 14 TSs

FIG. 9

| TS NUMBER (26A) | FIRST GATE (26B) | SECOND GATE (26C) | RETENTION PERIOD (26D) |
|---|---|---|---|
| 1 | O | O | 70us |
| 2 | O | O→C | 70us |
| 3 | O | C | 70us |
| 4 | O | C | 70us |
| 5 | O | C | 70us |
| 6 | O | C | 70us |
| 7 | O | C→O | 70us |
| 8 | O | O | 70us |
| ⋮ | | | |
| 13 | O | O | 70us |
| 14 | O | O | 90us |

ONE PERIOD = 1 ms = 14 TSs

FIG. 14

| TS NUMBER (26A) | FIRST GATE (26B) | SECOND GATE (26C) | RETENTION PERIOD (26D) |
|---|---|---|---|
| 1 | O | O | 70us |
| 2 | O | O | 70us |
| 3 | O | O | 70us |
| 4 | O | O→C | 70us |
| 5 | O | O→C | 70us |
| 6 | O | O→C | 70us |
| 7 | O | O | 70us |
| 8 | O | O | 70us |
| ⋮ | | | |
| 13 | O | O | 70us |
| 14 | O | O | 90us |

ONE PERIOD = 1 ms = N TSs

PACKET PROCESSING APPARATUS AND PACKET PROCESSING METHOD

CROSS-REFERENCE TO RELATED APPLICATION

This application is a continuation application of International Application PCT/JP2018/000174, filed on Jan. 9, 2018 and designated the U.S., the entire contents of which are incorporated herein by reference. The International Application PCT/JP2018/000174 is based upon and claims the benefit of priority of the prior Japanese Patent Application No. 2017-014299, filed on Jan. 30, 2017, the entire contents of which are incorporated herein by reference.

FIELD

The embodiments discussed herein are related to a packet processing apparatus and a packet processing method.

BACKGROUND

Toward the realization of the fifth generation of cellular mobile communications system (5G), Centralized Radio Access Network (C-RAN) made up of baseband units (BBUs) and remote radio heads (RRHs) has been under consideration in recent years. For the mobile fronthaul (MFH) network between the BBUs and the RRHs, the Common Public Radio Interface (CPRI) scheme, in which radio analog signals are transmitted almost as they are, is being considered to be adopted.

In a communication system connected to the MFH network, information are handled as Layer-2 packets. For this reason, a network may be shared with the mobile backhaul (MBH) network connecting base stations, a wired network, or the like. However, in the communication system, MFH packets from the MFH network conflict with other packets, for example, MBH packets from the MBH network, and suffer output delay. To cope with this, there is known priority control processing to reduce such output delay. In the priority control processing, a following high-priority packet is preferentially read ahead of a low-priority packet in a queue. This helps reduce output delay of the high-priority packet, that is, a MFH packet.

In the priority control processing, however, when a high-priority packet arrives while a low-priority packet is being read, reading of the high-priority packet is stopped until the reading and outputting of the currently-read low-priority packet are completed. This results in a wait corresponding to up to approximately one packet. For example, when the link speed is 1 Gbps and the packet length is 9,000 bytes, an output delay of approximately 7 microseconds occurs. In the MFH circuit, the output delay between the RRHs and the BBUs is demanded to be 100 microseconds or shorter. Thus, this one-packet output delay is not negligible for multi-level node architectures.

To address this, Time-sensitive Networking (TSN) by the Institute of Electrical and Electronics Engineers (IEEE) 802.1 is under consideration as a further method of reducing output delay. TSN includes a scheme called Time Aware Shaper (TAS) by IEEE 802.1Qbv as a data plane function to reduce output delay of packets.

Related arts are disclosed in, for example, Japanese Laid-open Patent Publication No. 10-107803, Japanese Laid-open Patent Publication No. 2003-318964, Japanese National Publication of Patent Application No. 9-504672, and Japanese Laid-open Patent Publication No. 2016-116026.

As an example, assume a communication system having a plurality of levels of packet switches employing the TAS scheme. In such a system, in order to preferentially output an MFH packet as a high-priority packet, the packet switches have to adjust the timing to open and close their gates in the entire communication system, by taking into account the transmission timing of an MFH packet at the transmission end and transmission delay at each of the gates of the packet switches. In view of the above, it is desirable to be able to reduce output delay of high-priority packets.

SUMMARY

According to an aspect of the embodiments, a packet processing apparatus includes a plurality of queues that store received packets according to types of the received packets; and a processor coupled to the plurality of queues and configured to: collect information on packet quantity of received packets in each time slot, identify a periodicity pattern of the received packets based on the packet quantity of the received packets in each time slot, based on the identified periodicity pattern of the received packets, identify a time slot section where received packets of a predetermined type are to be outputted preferentially, and control opening and closing of each of the plurality of queues in the identified time slot section.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 4 is an explanatory diagram illustrating an example configuration of a list table;

FIG. 7 is an explanatory diagram illustrating an example of an updated list table;

FIG. 9 is an explanatory diagram illustrating an example of an updated list table;

FIG. 14 is an explanatory diagram illustrating an example list table;

DESCRIPTION OF EMBODIMENTS

Based on the drawings, embodiments of a packet processing apparatus and a packet processing method disclosed hereby are described in detail below. The embodiments do not limit the techniques disclosed herein. The following embodiments may be combined appropriately unless such a combination creates a contradiction.

Embodiment 1

Figure 1:
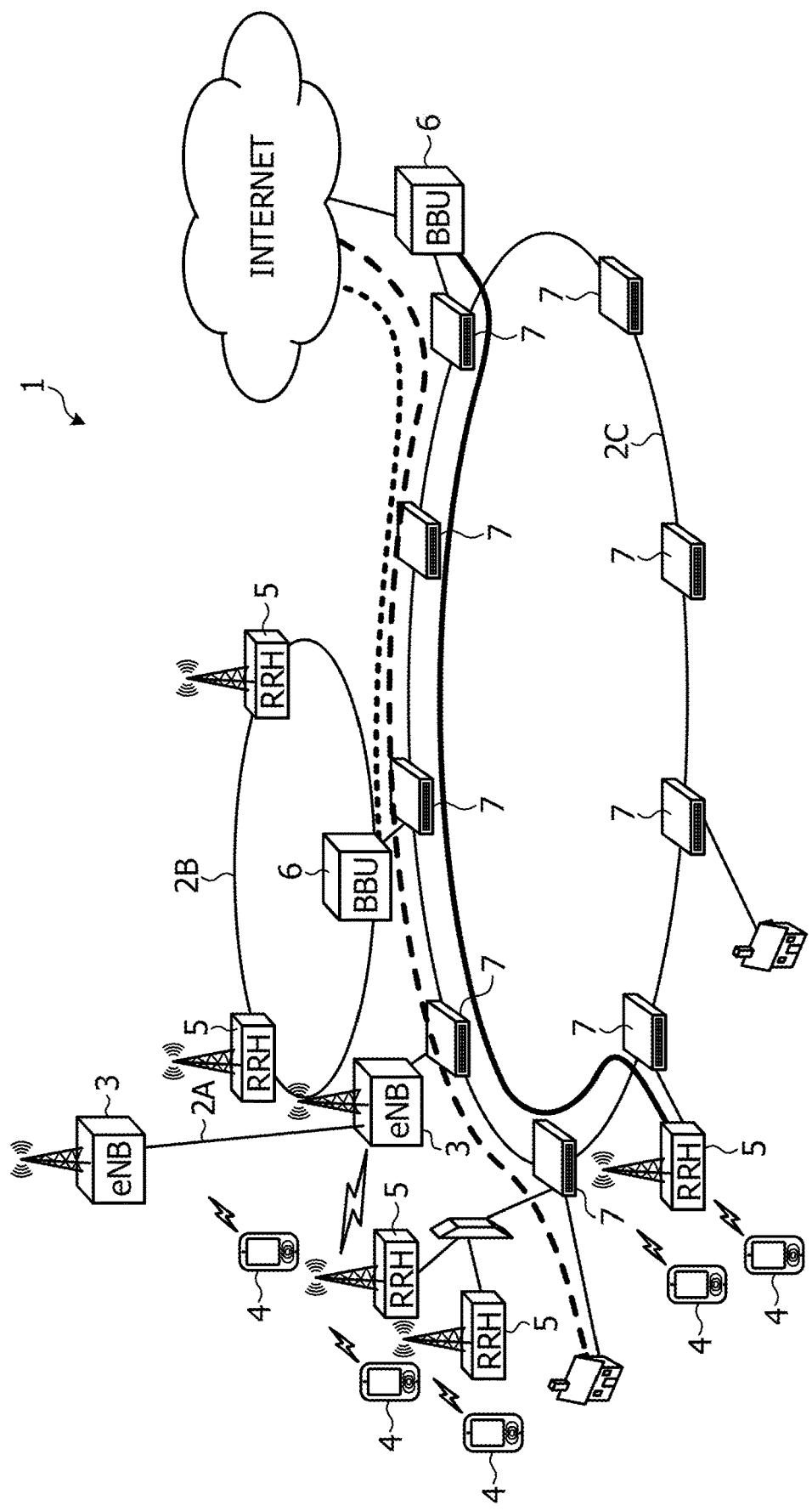
FIG. 1 is an explanatory diagram illustrating an example communication system of Embodiment 1.

FIG. 1 is an explanatory diagram illustrating an example of a communication system 1 of Embodiment 1. The communication system 1 illustrated in FIG. 1 has an MBH network 2A, an MFH network 2B, and a backbone network 2C. The MBH network 2A is a network connecting a plurality of base stations (evolved Node B (eNB)) 3 together. Each base station 3 wirelessly connects to wireless terminals 4 via a radio antenna. The MFH network 2B is a network connecting RRHs 5 and BBUs 6. Each RRH 5 wirelessly connects to the wireless terminals 4. The MFH network 2B employs the CPRI scheme, which transmits radio signals between the RRHs 5 and the BBUs 6 using L2-frame MFH packets. The backbone network 2C connects not only to the MBH network 2A and the MFH network 2B, but also to other wired networks, and transmits various types of packets such as MBH packets from the MBH network 2A and MFH packets from the MFH network 2B. There is a stronger demand to reduce output delay of MFH packets than of MBH packets.

The BBU 6 has a scheduling function for wireless sections. The scheduling function is a function to determine various elements to be transmitted in one sub-frame, which are, for example, user data, a code rate, and a modulation method. The BBU 6 divides user data into L2 frames and transmits MFH packets to the RRH 5. For example, the BBU 6 transmits MFH packets to the RRH 5 at sub-frame intervals, for example, every millisecond. The RRH 5 divides user data in received radio signals into L2 frames, and transmits MFH packets to the BBU 6.

The backbone network 2C is a network where a plurality of packet switches 7 are disposed and transmit MBH packets from the MBH network 2A or MFH packets from the MFH network 2B. The packet switches 7 transmit not only MBH and MFH packets, but also various other packets. The packet switches 7 employ the Time Aware Shaper (TAS) scheme by IEEE 802.1Qbv and output MFH packets as high-priority packets.

Figure 2:
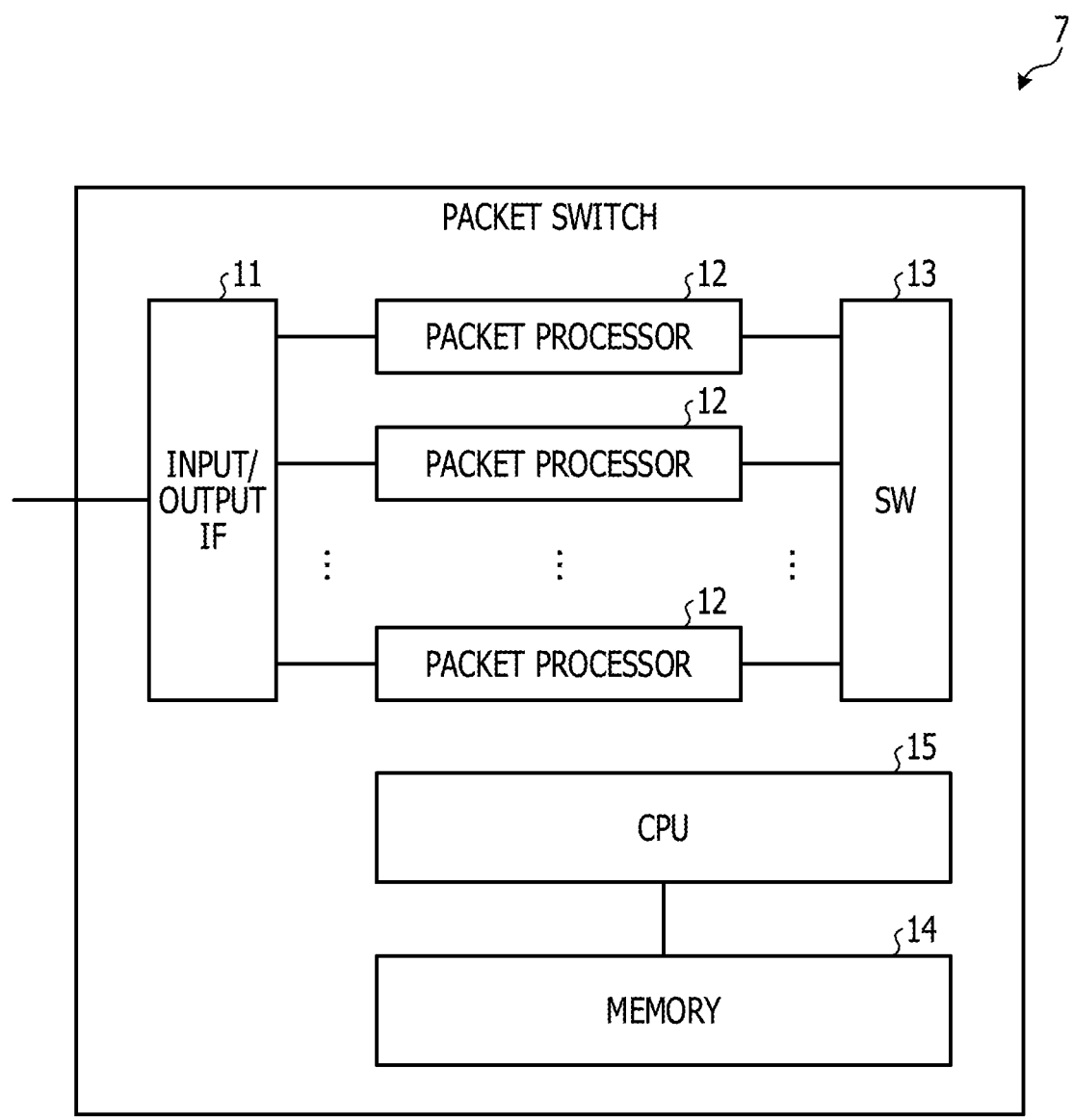
FIG. 2 is an explanatory diagram illustrating an example hardware configuration of a packet switch.

FIG. 2 is an explanatory diagram illustrating an example hardware configuration of the packet switch 7. The packet switch 7 illustrated in FIG. 2 has an input/output interface (IF) 11, a plurality of packet processors 12, a switch (SW) 13, memory 14, and a central processing unit (CPU) 15. The input/output IF 11 is an interface which is connected to the various networks such as the backbone network 2C and through which packets are inputted and outputted. The input/output IF 11 is connected to, for example, the RRHs 5, the BBUs 6, or other packet switches 7 connected to the backbone network 2C. The packet processors 12 perform packet processing conforming to the TAS scheme. The SW 13 is a switch that switches input and output of each of the packet processors 12. The memory 14 is an area to store various pieces of information. The CPU 15 controls the entire packet switch 7.

Figure 3:
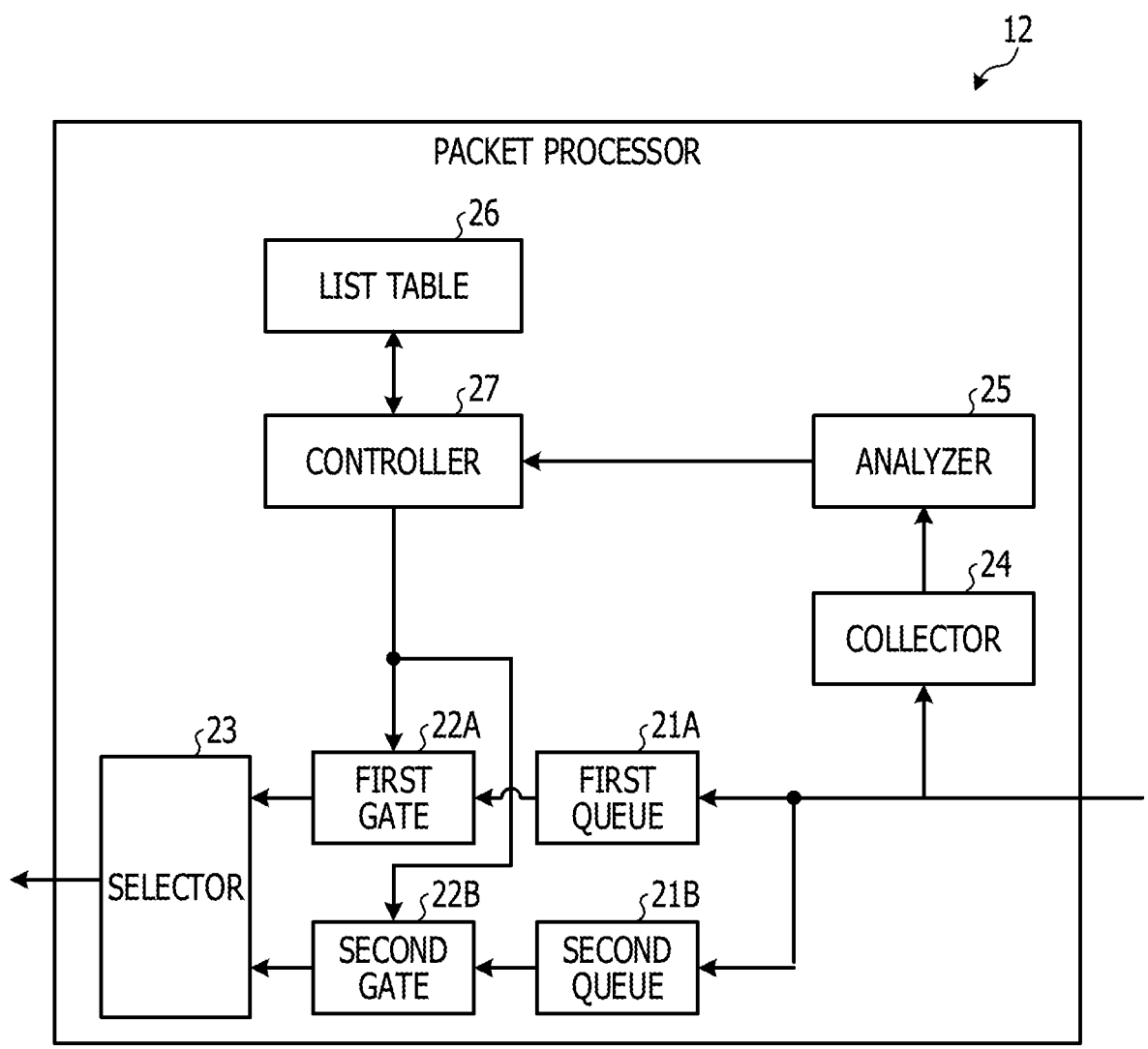
FIG. 3 is an explanatory diagram illustrating an example configuration of a packet processor.

FIG. 3 is an explanatory diagram illustrating an example of the packet processor 12. The packet processor 12 illustrated in FIG. 3 includes a first queue 21A, a second queue 21B, a first gate 22A, a second gate 22B, a selector 23, a collector 24, an analyzer 25, a list table 26, and a controller 27. The first queue 21A is a storage part that queues MFH packets among incoming received packets. The first queue 21A identifies the P bit in the VLAN tag in a received packet, and when determining based on the identification result that the received packet is an MFH packet, queues the MFH packet. The second queue 21B is a storage part that queues non-MFH packets, such as MBH packets, among incoming received packets. The second queue 21B identifies the P bit in the VLAN tag in a received packet, and when determining based on the identification result that the received packet is a non-MFH packet, queues the non-MFH packet. An MFH packet is a high-priority packet, whereas a non-MFH packet is a low-priority packet. Thus, preferentially outputting an MFH packet allows avoidance of a conflict with a non-MFH packet and hence reduction in the output delay of the MFH packet. The first gate 22A is an open/close part that opens or closes output of an MFH packet in the first queue 21A. The second gate 22B is an open/close part that opens or closes output of a non-MFH packet in the second queue 21B. The selector 23 selectively outputs a packet from the first gate 22A or a packet from the second gate 22B.

The collector 24 collects statistical information on received packets. The statistical information indicates packet quantity within a certain time duration. The packet quantity is for example the number of packets or the number of bytes. The analyzer 25 analyzes the statistical information on received packets and identifies the periodicity pattern of the received packets, such as the periodicity and the pattern of the received packets. The analyzer 25 learns the arrival interval (periodicity) and pattern (the average quantity of arriving packets, the degree of burst fluctuations) of the received packets. The controller 27 updates the table contents of the list table 26 based on the analysis results obtained by the analyzer 25. Based on the periodicity pattern of the received packets, the controller 27 updates TS numbers and the retention periods of the TS numbers in the list table 26. Based on the periodicity pattern, the controller 27 further updates the setting statuses of the first gate 22A and the second gate 22B for each TS number in the list table 26. Based on the statistical information on MFH packets in received packets, the controller 27 predicts the timing at which an MFH packet, which is a high-priority packet, will arrive. The setting statuses of the first gate 22A and the second gate 22B are information on whether the first gate 22A and the second gate 22B are open or closed, and indicate "open" or "closed", for example. Since an MFH packet is a high-priority packet and a non-MFH packet is a low-priority packet, the controller 27 opens the first gate 22A at all times, and opens or closes the second gate 22B on a per-time-slot (TS) basis. When open, the first gate 22A outputs an MFH packet retained in the first queue 21A. When open, the second gate 22B outputs a non-MFH packet retained in the second queue 21B, and when closed, the second gate 22B stops output of a non-MFH packet retained in the second queue 21B and outputs an MFH packet retained in the first queue 21A.

FIG. 4 is an explanatory diagram illustrating an example of the list table 26. The list table 26 illustrated in FIG. 4 manages a TS number 26A, a setting status 26B of the first gate 22A, a setting status 26C of the second gate 22B, and a retention period 26D, all in association with one another. The TS number 26A is an identification number of the time slot (TS) of received packets. The setting status 26B of the first gate 22A is gate open/close information indicating whether the first gate 22A is open (O) or closed (C). The setting status 26C of the second gate 22B is gate open-or-closed information indicating whether the second gate 22B is open (O) or closed (C). The retention period 26D is a period of time allocated to the TS number 26A. The TS number 26A is appropriately changeable in the range from 1 to N. The setting status 26B of the first gate 22A and the setting status 26C of the second gate 22B are also appropriately changeable for each TS number 26A. The retention period 26D is also appropriately changeable for every TS number 26A. The controller 27 refers to the list table 26 and sets the setting statuses of the first gate 22A and the second gate 22B for the TS number "1" at the timing of the TS number "1". Next, the controller 27 sets the setting statuses of the first gate 22A and the second gate 22B for the TS number "2" at the timing of TS number "2". Further, the controller 27 sequentially sets the setting statuses of the first gate 22A and the second gate 22B for the TS numbers "3" to "N" at the timings of the TS numbers "3" to "N", respectively. Then, after setting the setting statuses for the TS number "N", the controller 27 returns to the TS number "1" to set the setting statuses for the TS number "1" and further sequentially sets the setting statuses at the timings of the TS numbers "2" to "N". In sum, the controller 27 refers to the list table 26 and repeats setting the setting statuses of the first gate 22A and the second gate 22B at the timings of the TS numbers "1" to "N" sequentially and periodically.

Figure 5:
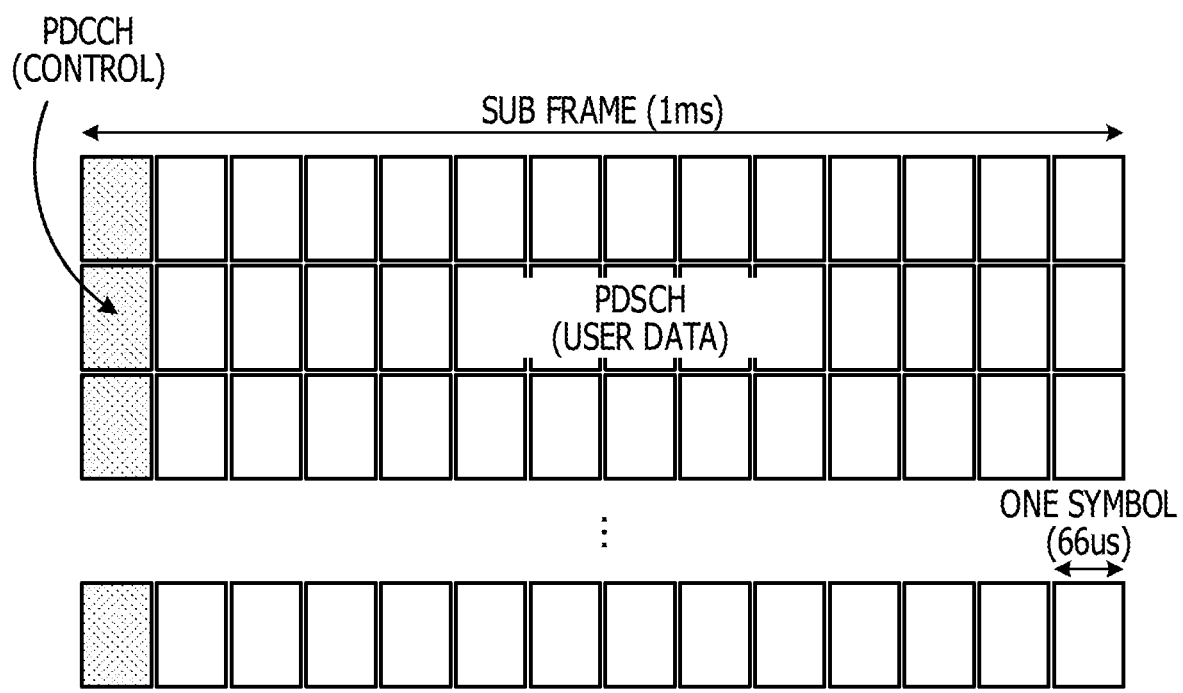
FIG. 5 is an explanatory diagram illustrating an example signal configuration of a radio signal.

FIG. 5 is an explanatory diagram illustrating an example signal configuration of a radio signal. The radio signal illustrated in FIG. 5 is, for example, formed of a one-millisecond-long sub-frame and has a physical downlink control channel (PDCCH) and a physical downlink shared channel (PDSCH). The PDCCH is an area for storing control information. The control information is, for example, bandwidth reservation amount. The PDSCH is an area for storing user data. The bandwidth reservation amount is, for example, information indicative of the amount of resource blocks (RB) in the PDSCH which are allocated to the user data.

Figure 6:
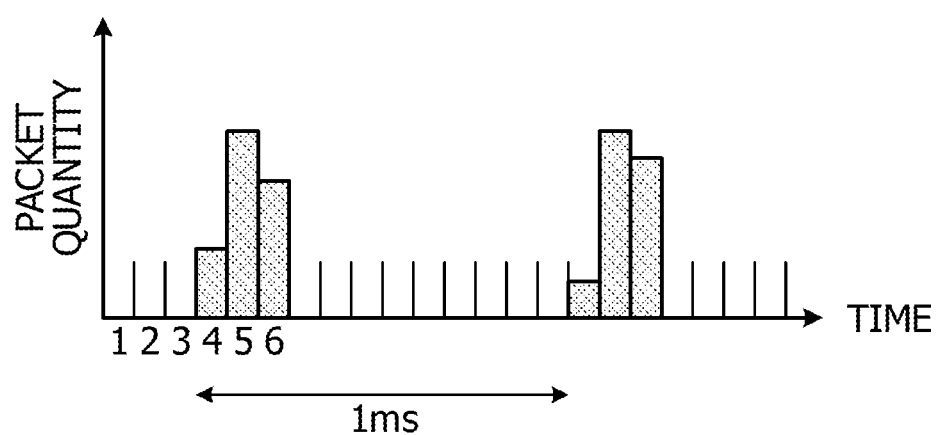
FIG. 6 is an explanatory diagram illustrating example statistical information.

FIG. 6 is an explanatory diagram illustrating example statistical information. The vertical axis indicates the packet quantity of received packets, and the horizontal axis indicates time. Based on the statistical information, the analyzer 25 identifies a periodicity pattern in which a burst section includes "4", "5", and "6". A burst section is a section with data, that is, a section where statistical information is positive. The controller 27 has the analyzer 25 identify the periodicity pattern of received packets, and when a periodicity pattern is identified a predetermined number of times in a row, determines that the periodicity pattern is of MFH packets. FIG. 7 is an explanatory diagram illustrating an example of the list table 26 updated. After determining that a periodicity pattern is of MFH packets, the controller 27 identifies a burst TS section in the periodicity pattern. A burst TS section is a TS section with data, that is a TS section where statistical information is positive. Then, the controller 27 identifies the burst TS section in the periodicity pattern thus identified and one-TS-long margin sections preceding and following the burst TS section, and sets the setting statuses of the second gate 22B to "close" for the TS numbers in the burst TS section and in the margin sections. For example, for the periodicity pattern illustrated in FIG. 6, the controller 27 identifies "4", "5", and "6" as a burst section. If, for example, a periodicity pattern where a burst section includes "4", "5", and "6" is identified, the controller 27 identifies the TS numbers "4", "5", and "6" as a burst TS section illustrated in FIG. 7. In addition, the controller 27 identifies, as margin sections, the TS number immediately preceding the burst TS section, that is, the TS number "3" which is one TS before the TS number "4", and the TS number immediately following the burst TS section, that is, the TS number "7" which is one TS after the TS number "6". Then, the controller 27 updates the contents of the list table 26 to set the second gate 22B to "close" for the burst TS section and the margin sections, namely the section from the TS numbers "3" to "7". Since the packet switch 7 is a free-running clock, a lag may occur between the packet switch 7 and the other packet switches 7, the BBU 6, and the RRH 5 due to clock deviations.

Figure 8:
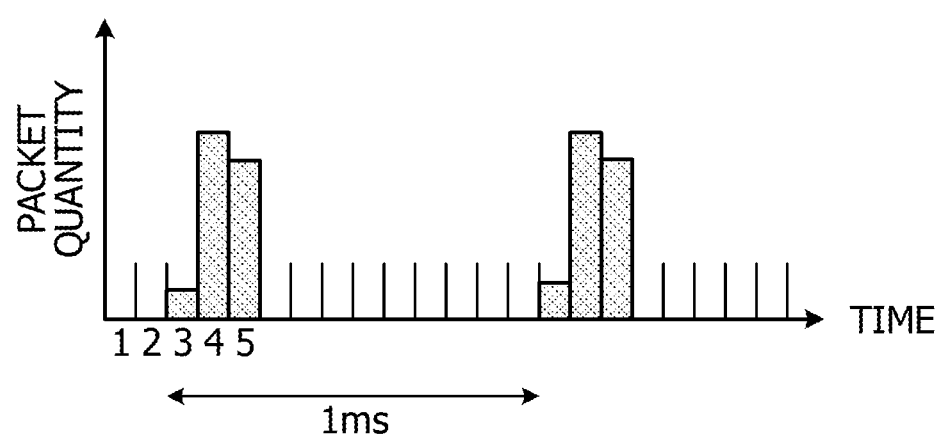
FIG. 8 is an explanatory diagram illustrating example statistical information observed when a lag occurs.

FIG. 8 is an explanatory diagram illustrating example statistical information observed when a lag occurs. The vertical axis indicates the packet quantity of received packets, and the horizontal axis indicates time. From the statistical information, the analyzer 25 identifies a periodicity pattern where a burst section is "3", "4", and "5". Then, the controller 27 has the collector 24 identify a periodicity pattern sequentially, and when a periodicity pattern is identified a predetermined number of times in a row, sequentially determines that the periodicity pattern is of MFH packets. As a result, for the periodicity pattern illustrated in FIG. 8, the controller 27 identifies a burst section including "3", "4", and "5", for example. FIG. 9 is an explanatory diagram illustrating an example of the list table 26 updated. If, for example, a periodicity pattern where a burst section includes "3", "4", and "5" is identified, the controller 27 identifies the TS numbers "3", "4", and "5" as a burst TS section illustrated in FIG. 9. In addition, the controller 27 identifies, as margin sections, the TS number immediately preceding the burst TS section, that is, the TS number "2" which is one TS before the TS number "3", and the TS number immediately following the burst TS section, that is, the TS number "6" which is one TS after the TS number "5". Then, the controller 27 updates the contents of the list table 26 to set the second gate 22B to "close" for the burst TS section and the margin sections, namely the TS section from the TS numbers "2" to "6". When updating the list table 26 illustrated in FIG. 7 to the list table 26 illustrated in FIG. 9, the controller 27 minimizes the updating of the setting status 26C of the second gate 22B from the TS numbers "3" to "7" to the TS numbers "2" to "6". Specifically, while maintaining the "closed" status of the second gate 22B for the TS numbers "3" to "6", the controller 27 sets the TS number "2" to "closed" and the TS number "7" to "open".

Figure 10:
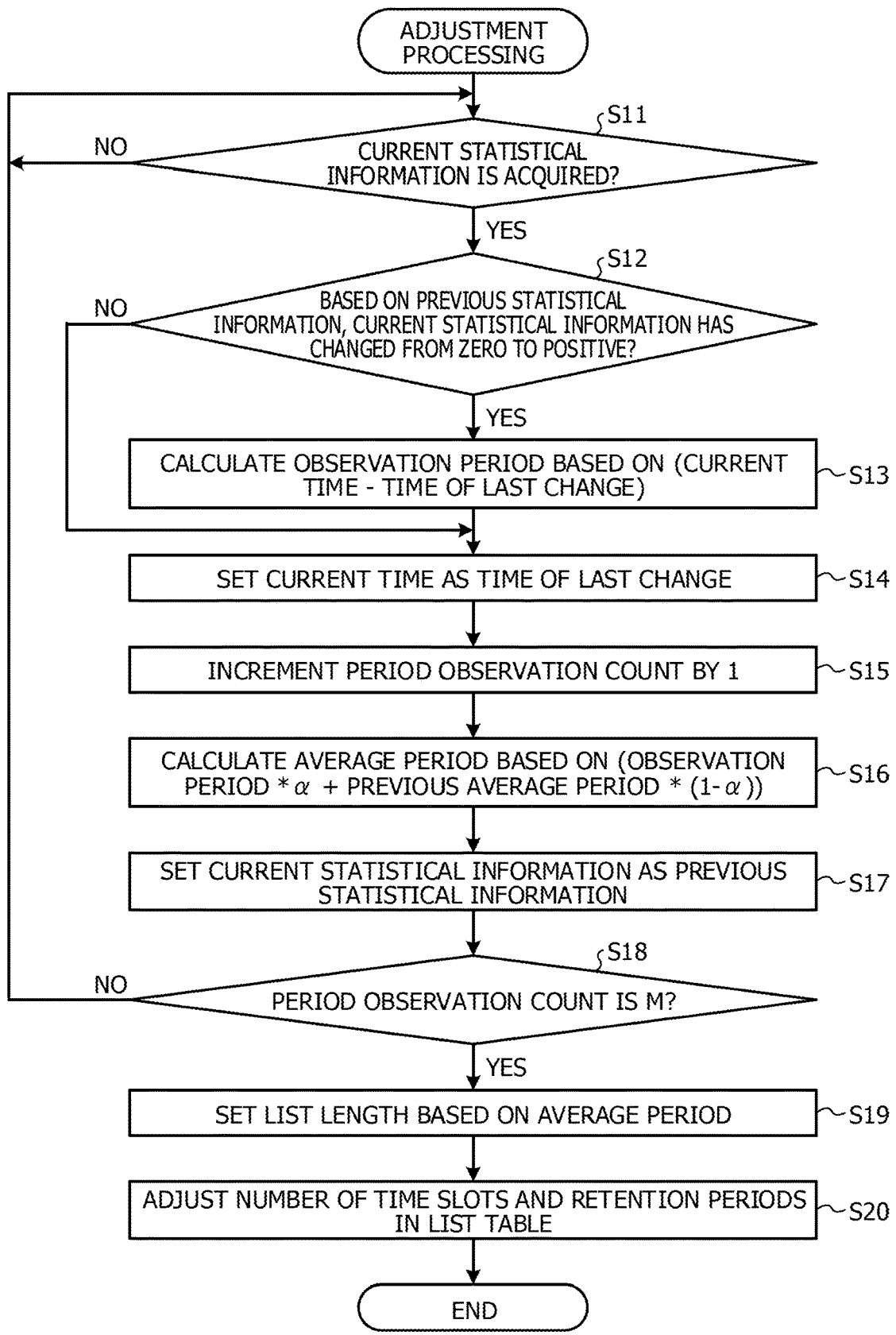
FIG. 10 is a flowchart illustrating an example processing operation related to adjustment processing performed by the packet processor.

Next, operation performed by the communication system 1 of Embodiment 1 is described. FIG. 10 is a flowchart illustrating an example processing operation related to adjustment processing performed by the packet processor 12. In FIG. 10, the collector 24 in the packet processor 12 determines whether the current statistical information has been acquired (S11). The statistical information indicates the packet quantity of currently-received packets. When statistical information has been acquired (Yes in S11), the analyzer 25 in the packet processor 12 determines based on the previous statistical information whether the current statistical information has changed from zero to positive (S12).

When the current statistical information has changed from zero to positive (Yes in S12), the analyzer 25 determines that the current TS is the start point of a burst section of received packets, and calculates an observation period based on the formula (the current time− the time of the last change) (S13). The observation period is a periodicity pattern in which MFH packets arrive.

The analyzer 25 sets the time of the last change as the current time (S14), and increments the period observation count by 1 (S15). The analyzer 25 calculates the average period based on the formula (the observation period*α)+(the previous average period*(1−α)) (S16). The coefficient α is 0<α<1.

The analyzer 25 sets the current statistical information acquired in S11 as the previous statistical information (S17), and determines whether the period observation count reaches M (S18). M is a threshold of the period observation count. When the period observation count is M (Yes in S18), the controller 27 in the packet processor 12 sets the list length of the list table 26 based on the average period (S19). The controller 27 adjusts the TS count (TS numbers) and retention periods in the list table 26 based on the average period (S20), and ends the processing operation illustrated in FIG. 10.

When the current statistical information has not been acquired (No in S11) or when the period observation count is not M (No in S18), the controller 27 proceeds back to S11 to determine whether the current statistical information has been acquired.

When the current statistical information has not changed from zero to positive (No in S12), the analyzer 25 proceeds to S14 to set the current time as the time of the last change.

When determining based on the previous statistical information that the current statistical information has changed from zero to positive, the analyzer 25 that performs the adjustment processing calculates an observation period using the formula (the current time− the time of last change), and increments the period observation count by 1. The analyzer 25 calculates the average period based on the formula (observation period*α+ the previous average period*(1−α)). When the period observation count is M, the controller 27 adjusts the list length, the TS count, and the retention periods in the list table 26 based on the average period. As a result, the controller 27 is able to acquire the list length, TS count (TS numbers), and retention periods in the list table 26 which are in accordance with the received packets.

Figure 11A:
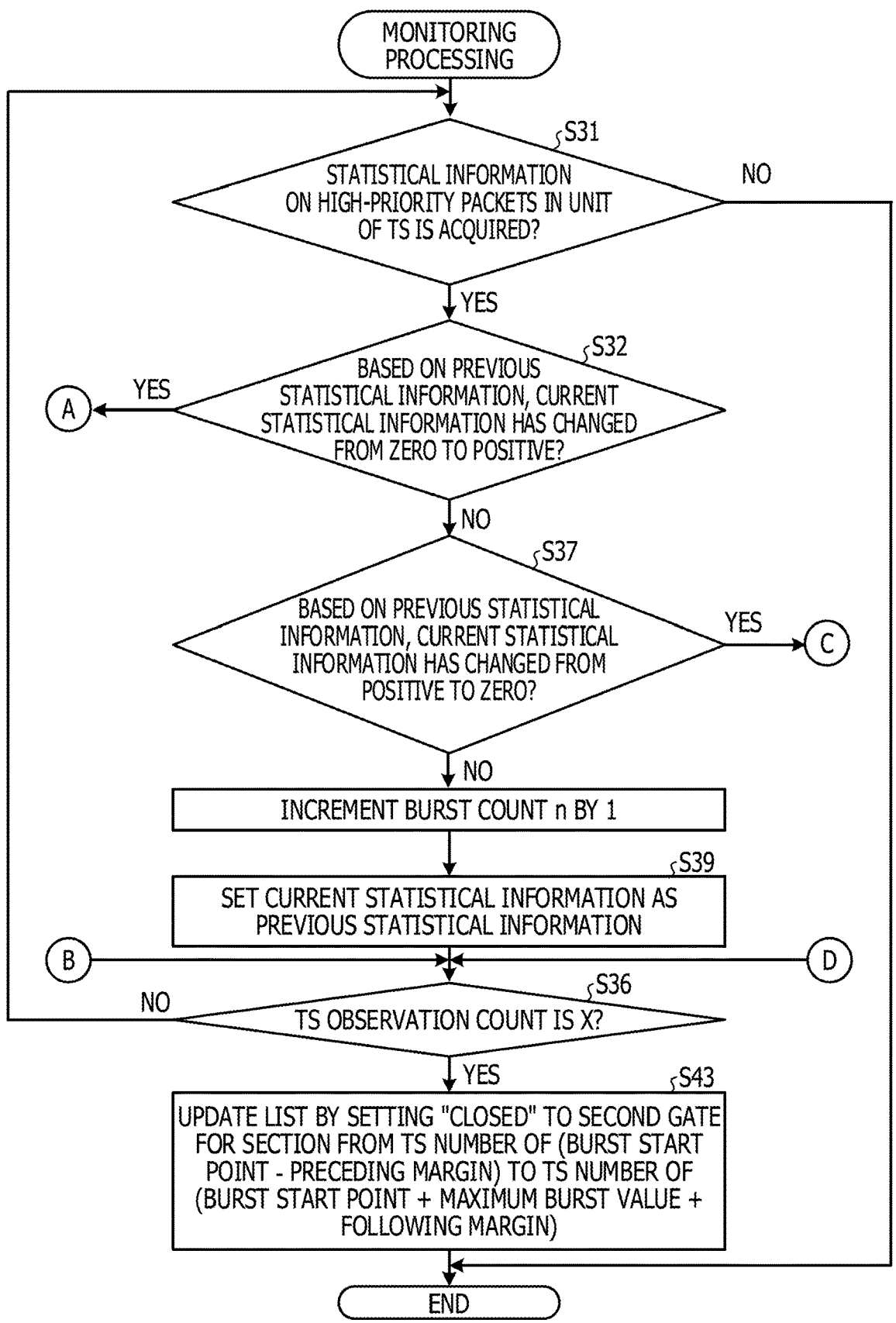
FIGS. 11A and 11B are flowcharts illustrating an example processing operation related to monitoring processing performed by the packet processor.
Figure 11B:
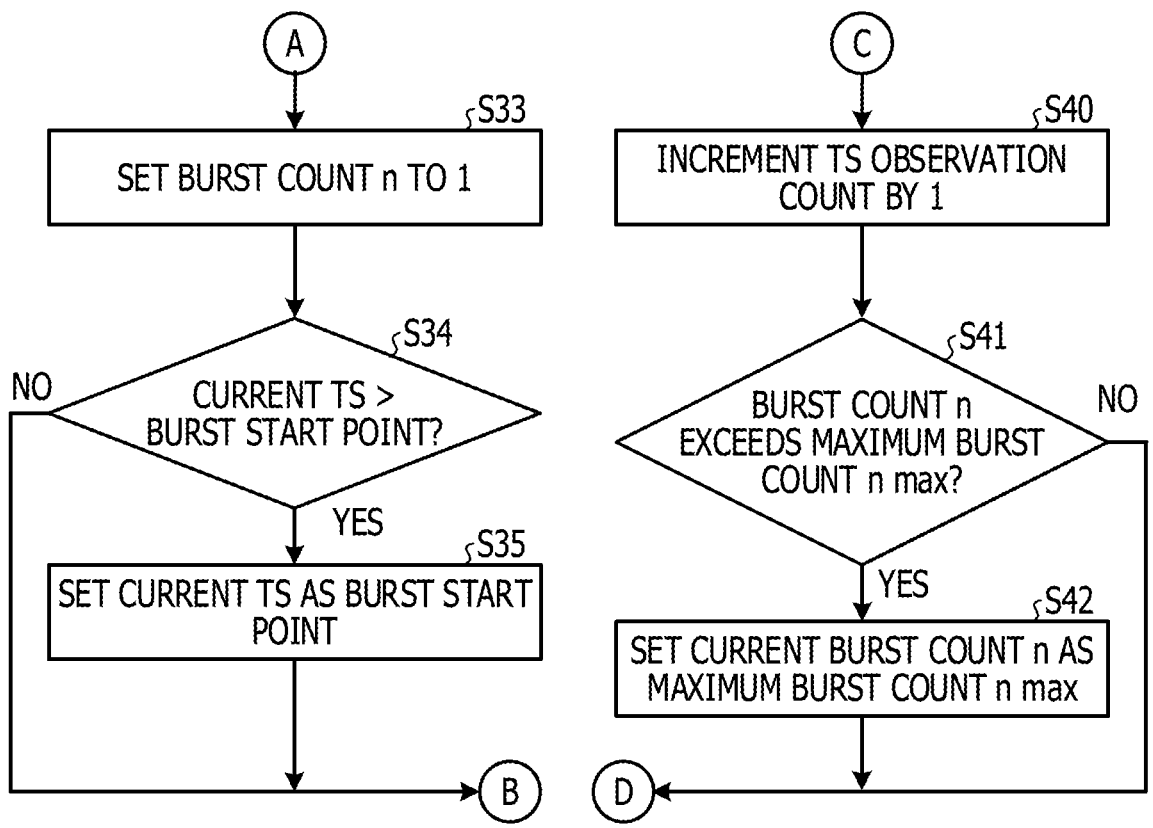

FIGS. 11A and 11B are flowcharts of an example processing operation related to monitoring processing performed by the packet processor 12. In FIG. 11A, the collector 24 determines whether statistical information on high-priority packets in the unit of TS has been acquired (S31). The high-quality packets are MFH packets. When statistical information on high-priority packets has been acquired (Yes in S31), the analyzer 25 determines based on the previous statistical information whether the current statistical information has changed from zero to positive (S32).

When the current statistical information has changed from zero to positive (Yes in S32), the controller 27 determines that the current TS is the start point of a burst section and sets the burst count n to 1 (S33). The controller 27 determines whether the current TS is larger than the currently-set burst start point (S34). The current TS is a TS where the current statistical information has changed from zero to positive.

When the current TS is larger than the currently-set burst start point (Yes in S34), the controller 27 sets the current TS as the burst start point (S35), and determines whether the TS observation count is X (S36). X is a threshold of the TS observation count.

When the current statistical information has not changed from zero to positive (No in S32), the analyzer 25 determines based on the previous statistical information whether the current statistical information has changed from positive to zero (S37). When the current statistical information has not changed from positive to zero (No in S37), the controller 27 determines that the burst section is in continuation and increments the current burst count n by 1 (S38). Further, the controller 27 sets the current statistical information as the previous statistical information (S39), and proceeds back to S36 to determine whether the TS observation count is X.

When the current statistical information has changed from positive to zero (Yes in S37), the controller 27 determines that the current TS is the end point of the burst section, and increments the TS observation count by 1 (S40). The controller 27 determines whether the burst count n exceeds the currently-set maximum burst count n max (S41). When the burst count n exceeds the currently-set maximum burst count n max (Yes in S41), the controller 27 sets the current burst count n as the maximum burst count (S42), and proceeds back to S36 to determine whether the TS observation count is X.

When the TS observation count is X (Yes in S36), the controller 27 changes the setting statuses of the second gate 22B to "close" for the TS section from the TS number corresponding to (the burst start point− the preceding margin) to the TS number corresponding to (the burst start point+ the maximum burst count+ the following margin) (S43). Then, the controller 27 ends the processing operation illustrated in FIGS. 11A and 11B. The preceding margin is one TS long, and the following margin is also one TS long.

When statistical information on high-priority packets has not been acquired (No in S31), the collector 24 ends the processing operation illustrated in FIGS. 11A and 11B. When the current TS is not larger than the burst start point (No in S34), the controller 27 proceeds to S36 to determine whether the TS observation count is X. When the burst count n does not exceed the currently-set maximum burst count (No in S41), the controller 27 proceeds to S36 to determine whether the TS observation count is X. When the TS observation count is not X (No in S36), the controller 27 proceeds back to S31 to determine whether statistical information on high-priority packets has been acquired.

The controller 27 that performs monitoring processing acquires statistical information on high-priority packets (MFH packets), sets the burst count n to 1 when determining based on the previous statistical information that the current statistical information has changed from zero to positive, and sets the current TS as the TS number of the burst start point. Further, the controller 27 increments the burst count n by 1 when determining based on the previous statistical information that the current statistical information has not changed from positive to zero. Further, when determining based on the previous statistical information that the current statistical information has changed from positive to zero, the controller 27 increments the TS observation count by 1 and sets the current burst count as the maximum burst count.

When the TS observation count is X, the controller 27 sets the TS section from the TS number corresponding to (the burst start point– the preceding margin) to the TS number corresponding to (the burst start point+ the maximum burst count+ the following margin) as a closed section of the second gate 22B. Since the first gate 22A is open all the time, MFH packets are outputted preferentially in the closed section of the second gate 22B.

Figure 12:
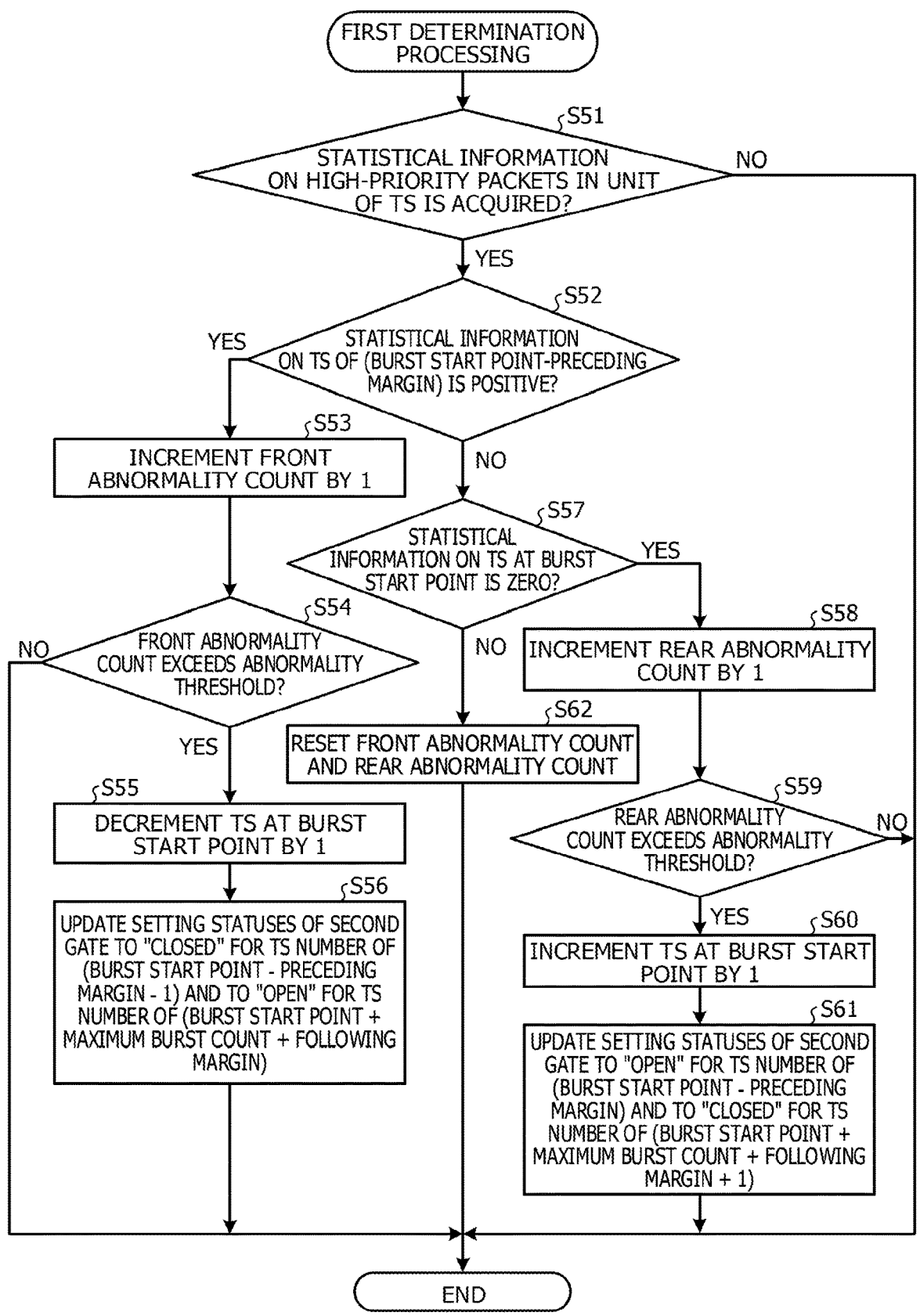
FIG. 12 is a flowchart illustrating an example processing operation related to first determination processing performed by the packet processor.

FIG. 12 is a flowchart illustrating a processing operation related to first determination processing performed by the packet processor 12. In FIG. 12, the collector 24 determines whether statistical information on high-priority packets (MFH packets) in the unit of TS has been acquired (S51). When statistical information on high-priority packets has been acquired (Yes in S51), the controller 27 determines whether the statistical information on the TS corresponding to (the burst start point– the preceding margin) is positive (S52).

When the statistical information on the TS corresponding to (the burst start point– the preceding margin) is positive (Yes in S52), the controller 27 determines that there is a front abnormality because statistical information on the TS is normally zero, and increments a front abnormality count by 1 (S53). Then, the controller 27 determines whether the front abnormality count exceeds an abnormality threshold (S54).

When the front abnormality count exceeds the abnormality threshold (Yes in S54), the controller 27 decrements the TS number of the burst start point by 1 (S55). Further, the controller 27 updates the setting statuses of the second gate 22B in the list table 26, setting the TS number corresponding to (the burst start point– the preceding margin– 1) to "closed" and the TS number corresponding to (the burst start point+ the maximum burst count+ the subsequent margin) to "open" (S56). Then, the controller 27 ends the processing operation illustrated in FIG. 12.

When the statistical information on the TS corresponding to (the burst start point– the preceding margin) is not positive (No in S52), the controller 27 determines whether the statistical information on the TS number at the burst start point is zero (S57). When the statistical information on the TS number at the burst start point is zero (Yes in S57), the controller 27 determines that there is a rear abnormality since statistical information on the TS is normally positive, and increments a rear abnormality count by 1 (S58). The controller 27 then determines whether the rear abnormality count exceeds an abnormality threshold (S59).

When the rear abnormality count exceeds the abnormality threshold (Yes in S59), the controller 27 increments the TS number at the burst starting point by 1 (S60). The controller 27 updates the setting statuses of the second gate 22B in the list table 26, setting the TS number corresponding to (the burst start point– the preceding margin) to "open" and the TS number corresponding to (the burst start point+ the maximum burst count+ the subsequent margin+1) to "closed" (S61). Then, the controller 27 ends the processing operation illustrated in FIG. 12.

When the statistical information on the TS number at the burst start point is not zero (No in S57), the controller 27 resets the front abnormality count and the rear abnormality count (S62), and ends the processing operation illustrated in FIG. 12. When the statistical information on high-priority packets (MFH packets) in the unit of TS has not been acquired (No in S51), the collector 24 ends the processing operation illustrated in FIG. 12. When the rear abnormality count does not exceed the abnormality threshold (No in S59), or when the front abnormality count does not exceed the abnormality count (No in S54), the controller 27 ends the processing operation illustrated in FIG. 12.

The controller 27 that performs the first determination processing acquires statistical information on MFH packets. When the statistical information on the TS number corresponding to (the burst start point– the preceding margin), that is, the TS number in the preceding margin, is positive, the controller 27 increments the front abnormality count by 1 because statistical information on the preceding margin is normally zero. When the front abnormality count exceeds the abnormality threshold, the controller 27 decrements the TS number at the burst start point by 1, and sets the setting status of the second gate 22B to "closed" for the TS number corresponding to (the burst start point– the preceding margin– 1). Further, the controller 27 sets the setting status of the second gate 22B to "open" for the TS number corresponding to (the burst start point+ the maximum burst start point+ the subsequent margin). As a result, even when MFH packets are moved to the front by one TS, the closed section of the second gate 22B is moved to the front by one TS.

When statistical information on MFH packets is acquired and when the statistical information at the burst start point is zero, the controller 27 increments the rear abnormality count by 1 since statistical information on the TS number at the burst start point is normally positive. When the rear abnormality count exceeds the abnormality threshold, the controller 27 decrements the TS number at the burst start point by 1 and sets the setting status of the second gate 22B to "open" for the TS number corresponding to (the burst start point– the preceding margin). Further, the controller 27 sets the setting status of the second gate 22B to "closed" for the TS number corresponding to (the burst start point+ the maximum burst start point+ the subsequent margin+ 1). As a result, even when MFH packets are moved to the rear by one TS, the closed section of the second gate 22B is moved to the rear by one TS.

The packet switch 7 of Embodiment 1 identifies the periodicity pattern of received packets based on the packet quantity in each time slot of received packets. Further, based on the identified periodicity pattern of received packets, the packet switch 7 identifies a burst TS section where MFH packets are to be preferentially outputted and controls the first gate 22a and the second gate 22B in the identified burst TS section. As a result, the packet switch 7 is able to recognize a burst TS section of MFH packets autonomously based on the periodicity pattern of received packets, and thus to reduce output delay of MFH packets. Moreover, the packet switch 7 is able to recognize the periodicity pattern of MFH packets autonomously without having to consider the setting statuses of the other packet switches 7 and transmission timing of MFH packets.

The packet switch 7 autonomously recognizes the periodicity pattern of MFH packets based on the packet quantity of MFH packets, and determines a non-MFH-packet closed section where MFH packets are to be preferentially outputted. As a result, the packet switch 7 is able to reduce output delay of MFH packets without complicated adjustments across networks, such as presetting of TAS function or time synchronization.

The packet switch 7 identifies a burst TS section of MFH packets and its preceding and following margin sections based on the packet quantity of MFH packets. Further, with the first gate 22A being open, the packet switch 7 sets the burst TS section and its preceding and following margin sections as a closed section of the second gate 22B. When the margin sections are thus provided, fast gate control is supportable while reducing output delay of MFH packets even if calculation speed is slow.

The packet switch 7 refers to the list table 26 and controls the first gate 22A and the second gate 22B in the burst TS section where MFH packets are to be preferentially outputted. As a result, the packet switch 7 is able to output MFH packets preferentially by referring to the list table 26. Based on the periodicity pattern, the packet switch 7 identifies the number of time slots of received packets, the TS lengths, and the setting statuses of the first gate 22A and the second gate 22B in each TS for each type, and updates the contents of the list table 26 to the contents identified. As a result, the packet switch 7 is able to autonomously update the contents of the list table 26.

The packet switch 7 detects a change in the periodicity pattern based on whether there is a change in packet quantity in the same time slot between the preceding and following periodicity patterns. Further, when detecting a change in the periodicity pattern, the packet switch 7 identifies, based on the following periodicity pattern, the number of TSs, the TS lengths, and the setting statuses of the first gate 22A and the second gate 22B. Then, the packet switch 7 updates the contents of the list table 26 to the contents thus identified. As a result, the packet switch 7 is able to autonomously update the contents of the list table 26.

For the burst TS section where MFH packets are to be preferentially outputted, the packet switch 7 stores, in the list table 26, "open" as the setting status of the first gate 22A and "closed" as the setting status of the second gate 22B. As a result, the packet switch 7 is able to output MFH packets preferentially by referring to the list table 26.

In the above embodiment, in addition to the burst TS section of MFH packets, its preceding and following one-TS-long margin sections are set to output MFH packets preferentially, that is, to stop output of non-MFH packets. However, the margin sections may not be provided by use of reservation bandwidth amount or Length information in the control packet in the MFH packets. Such an embodiment will be described below as Embodiment 2.

Embodiment 2

Figure 13:
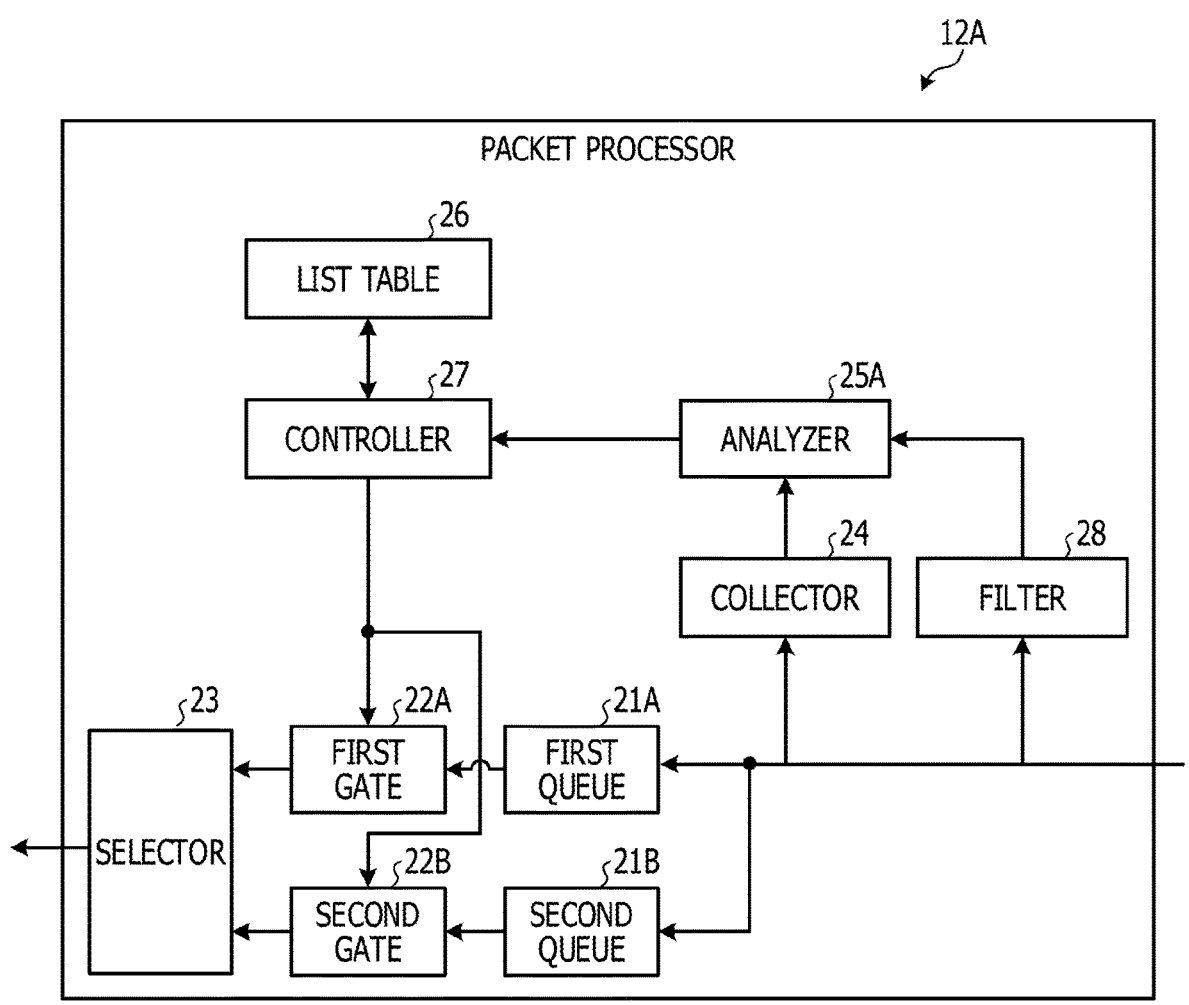
FIG. 13 is an explanatory diagram illustrating an example configuration of a packet processor of Embodiment 2.

FIG. 13 is an explanatory diagram illustrating an example configuration of a packet processor 12A of Embodiment 2. By using the same reference numerals for the same configurations as the communication system 1 of Embodiment 1, descriptions of the same configurations and operations will be omitted. The packet processor 12A illustrated in FIG. 13 has an analyzer 25A and a filter 28 in addition to the first queue 21A, the second queue 21B, the first gate 22A, the second gate 22B, the selector 23, the collector 24, the list table 26, and the controller 27. The filter 28 extracts a control packet in MFH packets. Based on the control packet extracted by the filter 28, the analyzer 25A identifies the periodicity pattern of MFH packets. When the control packet is a downlink control packet, the analyzer 25A identifies the periodicity pattern of downlink MFH packets in, for example, 4 milliseconds based on the Length information in the control packet. When the control packet is an uplink control packet, the analyzer 25A identifies the periodicity pattern of uplink MFH packets based on the reservation bandwidth amount in the control packet.

FIG. 14 is an explanatory diagram illustrating example table contents of the list table 26. In the list table 26 illustrated in FIG. 14, the number of TSs is N=14, and the second gate 22B is closed in the TS numbers "4", "5", and "6".

Figure 15:
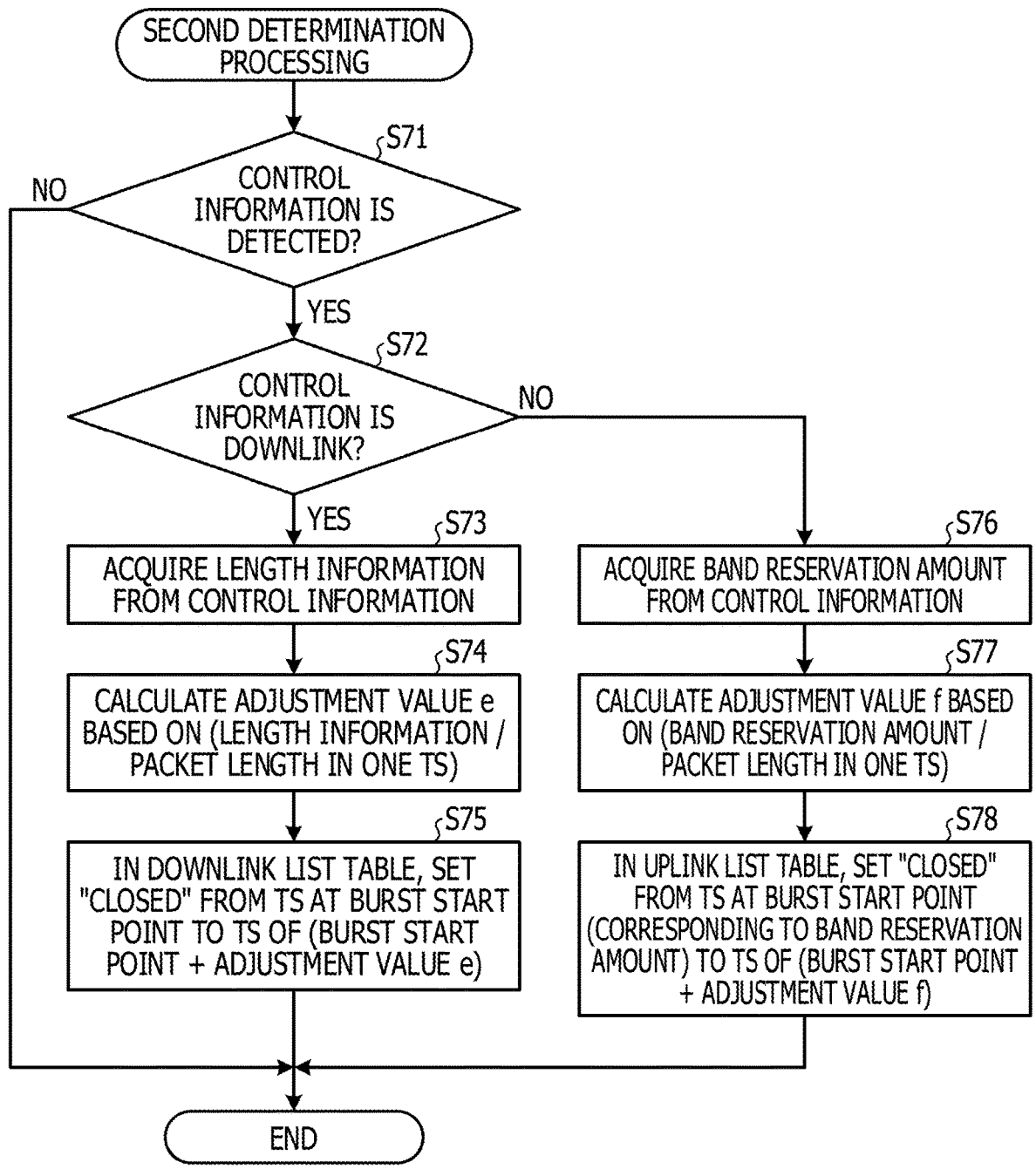
FIG. 15 is a flowchart illustrating an example processing operation related to second determination processing performed by the packet processor.

Next, operation performed by the communication system 1 of Embodiment 2 is described. FIG. 15 is a flowchart illustrating an example processing operation related to second determination processing performed by the packet processor 12A. In FIG. 15, the analyzer 25A in the packet processor 12A determines whether control information has been detected through the filter 28 (S71). The filter 28 extracts control information from MFH packets. When control information is detected (Yes in S71), the analyzer 25A determines whether the control information is downlink control information (S72). Downlink control information is, for example, control information on MFH packets from the BBU 6 to the RRH 5.

When the control information is downlink control information (Yes in S72), the analyzer 25A acquires Length information from the control information (S73). The analyzer 25A calculates an adjustment value e based on (the Length information/the packet length in one TS) (S74). In the downlink list table 26, the controller 27 sets "closed" to a burst TS section of MFH packets from the TS number at the burst start point to the TS number corresponding to (the burst start point+ the adjustment value e) (S75). The controller 27 then ends the processing operation illustrated in FIG. 15. When determining based on the Length information that the packet length of the following packets is 5,000 bytes, the controller 27 does not provide margins and sets the setting statuses of the second gate 22B to "close" for the TS numbers "4", "5", and "6" since there are three time slots in 5,000 bytes.

When the control information is not downlink control information (No in S72), the analyzer 25A determines that the control information is uplink control information, and acquires a bandwidth reservation amount from the control information (S76). Uplink control information is, for example, control information on MFH packets from the RRH 5 to the BBU 6. The analyzer 25A calculates an adjustment value f based on (the bandwidth reservation amount/the packet length in one TS) (S77). In the uplink list table 26, the controller 27 sets "closed" to a burst TS section of MFH packets from the TS number at the burst start point corresponding to the bandwidth reservation amount to the TS number corresponding to (the burst start point+ the adjustment value f) (S78), and ends the processing operation illustrated in FIG. 15. When determining based on the bandwidth reservation amount that the bandwidth reservation amount for packets in four milliseconds is 5,000 bytes, the controller 27 does not provide margins and sets the second gate 22B to "close" for the TS numbers "4", "5", and "6" since there are three time slots in 5,000 bytes.

The packet switch 7 of Embodiment 2 sets a closed section for the second gate 22B based on the Length information or the reservation bandwidth amount in control information, without setting margin sections. As a result, the packet switch 7 identifies a burst TS section of MFH packets with high precision using control information. The packet switch 7 reduces output delay of MFH packets, and moreover, improves network usage by non-MFH packets because no margin section is provided.

In the above embodiments, there are two kinds of packets: an MFH packet as a high-priority packet and a non-MFH packet as a low-priority packet. However, the embodiments are not limited to those two kinds. Any number of kinds of packets may be employed appropriately. For example, when there are packets of three different priority levels, three gates are disposed, and the setting statuses of the respective gates are stored in the list table 26.

Although a sub-frame of a radio signal in the 4G mobile communications system is one millisecond long in the above embodiments, the duration is not limited to one millisecond.

For example, the duration of a sub-frame may be appropriately changed to support radio signals in the 5G mobile communications system.

In the above embodiments, the analyzer 25 (25A), the controller 27, and the list table 26 are disposed in the packet processor 12 (12A). Alternatively, the analyzer 25 (25A), the controller 27, and the list table 26 may be disposed in, for example, the CPU 15. Changes may be made appropriately.

In the above embodiments, one period of a sub-frame includes N time slots, but may be set to multiples of N as long as periodicity is retained. Changes may be made appropriately.

The constituents of each part illustrated in the drawings do not have to be physically configured as illustrated. Specific modes of distribution and integration of the parts are not limited to those illustrated, and all or part of the parts may be distributed or integrated functionally or physically in any unit in consideration of factors such as various types of loads and usage situations.

Further, all or any part of various processing functions performed by each device may be executed on a central processing unit (CPU) (or a microcomputer such as a micro processing unit (MPU) or a microcontroller unit (MCU)). It goes without saying that all or any part of the various processing functions may be executed on programs analyzed and executed by the CPU (or a microcomputer such as an MPU or MCU) or on wired-logic hardware.

Figure 16:
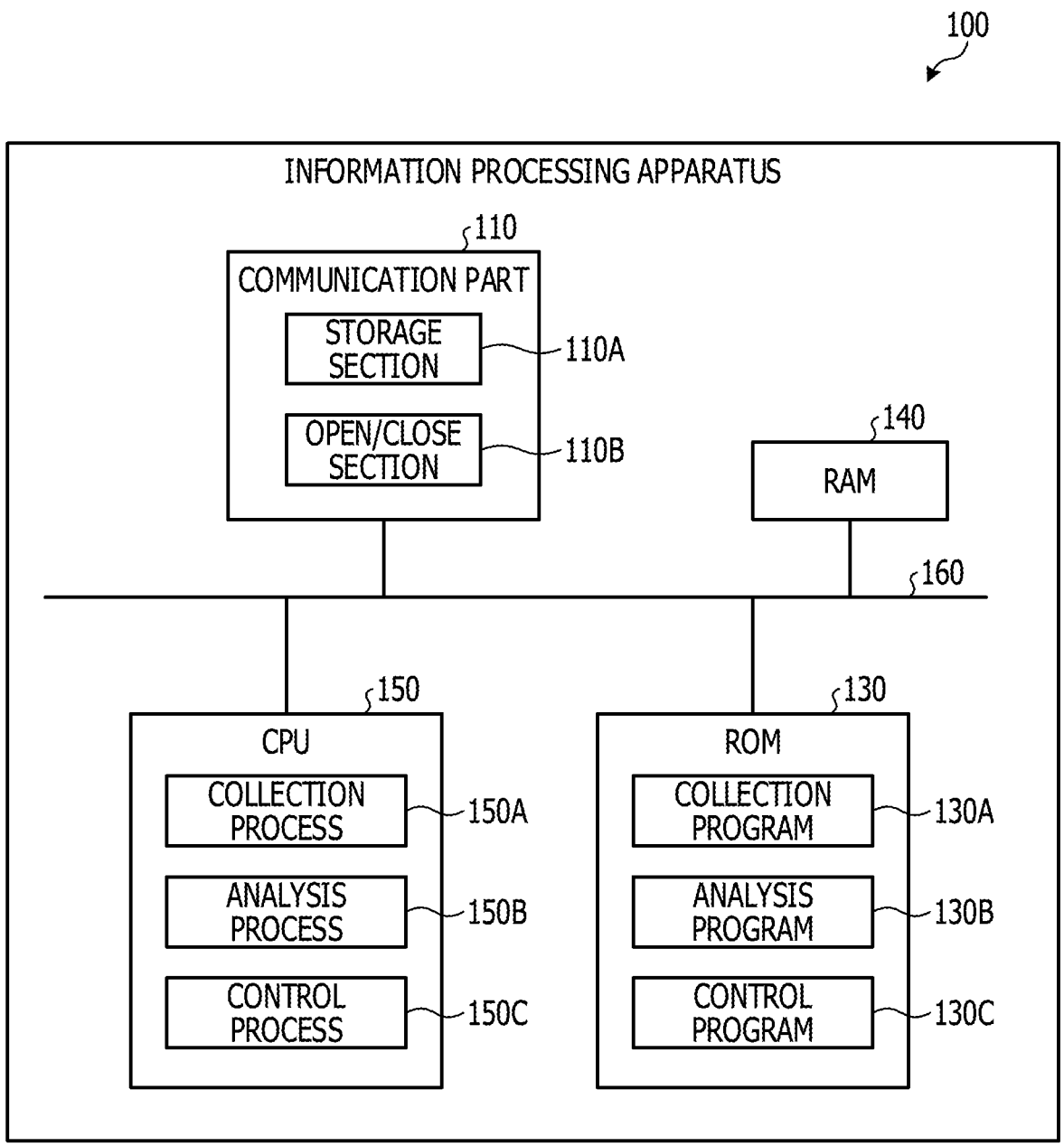
FIG. 16 is an explanatory diagram illustrating an example information processing apparatus that executes packet processing programs.

The various kinds of processing described in the embodiments may be implemented when prepared programs are executed by a processor such as a CPU in an information processing apparatus. The following describes an example information processing apparatus that executes programs for implementing the same functions as the above embodiments. FIG. 16 is an explanatory diagram illustrating an example information processing apparatus that executes packet processing programs.

An information processing apparatus 100 that executes packet processing programs illustrated in FIG. 16 includes a communication part 110, read only memory (ROM) 130, and random access memory (RAM) 140, and a CPU 150. The communication part 110, the ROM 130, the RAM 140, and the CPU 150 are connected via a bus 160. The communication part 110 receives packets. The communication part 110 has a plurality of storage sections 110A that store received packets according to the types of the received packets and open/close sections 110б that open or close output from the corresponding storage sections 110A.

Then, packet processing programs for implementing the same functions as the above embodiments are pre-stored in the ROM 130. The ROM 130 stores a collection program 130A, an analysis program 130B, and a control program 130C as the packet processing programs. The packet processing programs may be recorded not on the ROM 130 but on a recording medium which is computer-readable by a drive (not illustrated). Examples of such a recording medium may include a portable recording medium such as a CD-ROM, a DVD disk, or a USB memory device, and semiconductor memory such as flash memory.

The CPU 150 reads the collection program 130A from the ROM 130 and functions as a collection process 150A. Further, the CPU 150 reads the analysis program 130B from the ROM 130 and functions as an analysis process 150B. Furthermore, the CPU 150 reads the control program 130C from the ROM 130 and functions as a control process 150C.

The CPU 150 collects information on the packet quantity of received packets in each time slot. Based on the packet quantity of received packets in each time slot, the CPU 150 identifies the periodicity pattern of the received packets. Based on the identified periodicity pattern of the received packets, the CPU 150 identifies a time slot section where received packets of a predetermined type are to be outputted preferentially, and controls opening and closing of the open/close sections 110B in the identified time slot section. This consequently allows reduction in output delay of the received packets of the predetermined type.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A packet processing apparatus, comprising:
a plurality of queues that store a plurality of received packets respectively having a plurality of time slots and respectively being stored in one of the plurality of queues such that a storage destination is different from each other for types of the plurality of received packets; and
a processor coupled to the plurality of queues and configured to:
collect packet quantity of the plurality of received packets for each of the plurality of time slots,
identify a periodicity pattern of the plurality of received packets based on the packet quantity collected for each of the plurality of time slots,
based on the identified periodicity pattern, identify, from among the plurality of time slots, a time slot section where received packets of a predetermined type are to be outputted preferentially, and
control opening and closing of each of the plurality of queues in the identified time slot section.

2. The packet processing apparatus according to claim 1, further comprising
a memory that stores open-or-closed information on each of the types in each time slot,
wherein the processor is configured to use the open-or-closed information on each of the types in each time slot to control opening and closing of the plurality of queues in the time slot section where the received packets of the predetermined type are to be outputted preferentially.

3. The packet processing apparatus according to claim 2, wherein the processor is configured to
update first open-or-closed information and second open-or-closed information in association with each other, the first and second open-or-closed information being stored in the memory in association with a time slot where received packets of the predetermined type are to be outputted preferentially, the first open-or-closed information being used to open output from a first queue storing received packets of the predetermined type, the second open-or-closed information being used to close output from a second queue storing received packets of other than the predetermined type.

4. The packet processing apparatus according to claim 1, wherein the processor is configured to:
- extract control information from the received packets of the predetermined type, and
- identify a periodicity pattern of the received packets of the predetermined type based on a packet quantity of the received packets of the predetermined type in each time slot and on the control information of the received packets of the predetermined type thus extracted.

5. The packet processing apparatus according to claim 1, wherein the packet quantity is a number of packets or a number of bytes.

6. A packet processing method executed by a processor in a packet processing apparatus including a plurality of queues that store a plurality of received packets respectively having a plurality of time slots and respectively being stored in one of the plurality of queues such that a storage destination is different from each other for types of the plurality of received packets, the packet processing method comprising:
- collecting packet quantity of the plurality of received packets for each of the plurality of time slots;
- identifying a periodicity pattern of the plurality of received packets based on the packet quantity collected for each of the plurality of time slots;
- based on the identified periodicity pattern, identifying, from among the plurality of time slots, a time slot section where received packets of a predetermined type are to be outputted preferentially; and
- controlling opening and closing of the plurality of queues in the identified time slot section.

7. The packet processing method according to claim 6, wherein the controlling includes controlling the opening and closing of the plurality of queues by using open-or-closed information on each of the types in each time slot.

8. The packet processing method according to claim 7, further comprising:
- detecting a change in the periodicity pattern based on whether there is a change in packet quantity in a same time slot between preceding and following periodicity patterns,
- identifying a number of time slots, lengths of the time slots, and the open-or-closed information based on the following periodicity pattern, and
- based on the identified number of time slots, the identified lengths of the time slots, and the identified open-or-closed information, updating the number of time slots, the lengths of the time slots, and the open-or-closed information stored in a memory.

9. The packet processing method according to claim 6, wherein the identifying the periodicity pattern includes:
- extracting control information from the received packets of the predetermined type, and
- identifying a periodicity pattern of the received packets of the predetermined type based on a packet quantity of the received packets of the predetermined type in each time slot and on the control information of the received packets of the predetermined type thus extracted.

10. The packet processing method according to claim 6, wherein the packet quantity is a number of packets or a number of bytes.

* * * * *